United States Patent
Constantinou et al.

(10) Patent No.: US 10,316,641 B2
(45) Date of Patent: Jun. 11, 2019

(54) MONITORING WIRELINE COUPLING AND DISTRIBUTION

(71) Applicant: Schlumberger Technology Corporation, Sugar Land, TX (US)

(72) Inventors: Alexis Constantinou, Clamart (FR); Alireza Farahani, Southampton (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/463,327

(22) Filed: Mar. 20, 2017

(65) Prior Publication Data

US 2017/0284187 A1   Oct. 5, 2017

Related U.S. Application Data (60) Provisional application No. 62/316,001, filed on Mar. 31, 2016.

(51) Int. Cl.

| | |
|---|---|
| *E21B 47/00* | (2012.01) |
| *G01B 11/16* | (2006.01) |
| *E21B 17/20* | (2006.01) |
| *E21B 47/09* | (2012.01) |
| *E21B 47/12* | (2012.01) |
| *E21B 23/14* | (2006.01) |
| *E21B 47/10* | (2012.01) |

(52) U.S. Cl.
CPC .............. *E21B 47/00* (2013.01); *E21B 17/20* (2013.01); *E21B 23/14* (2013.01); *E21B 47/09* (2013.01); *E21B 47/102* (2013.01); *E21B 47/123* (2013.01); *G01B 11/18* (2013.01)

(58) Field of Classification Search
CPC .......... G01B 11/18; E21B 47/00; E21B 17/20
USPC .......................................................... 356/32
See application file for complete search history.

(56) References Cited

U.S. PATENT DOCUMENTS

| | | | | |
|---|---|---|---|---|
| 4,522,464 A * | 6/1985 | Thompson | ........... | G02B 6/4436 385/107 |
| 4,838,689 A * | 6/1989 | Neumann | .......... | G01M 11/3145 356/73.1 |
| 5,026,141 A * | 6/1991 | Griffiths | ................. | G01B 11/18 250/227.14 |
| 5,845,033 A * | 12/1998 | Berthold | ............. | E21B 47/0006 385/12 |
| 7,324,730 B2 * | 1/2008 | Varkey | ................. | G02B 6/4413 385/100 |
| 7,920,765 B2 * | 4/2011 | Varkey | ................... | H01B 7/046 385/101 |
| 7,946,341 B2 * | 5/2011 | Hartog | .................... | E21B 43/26 166/254.1 |

(Continued)

OTHER PUBLICATIONS

A. Motil, A. Bergman, M. Tur, State of the art of Brillouin fiber-optic distributed sensing, vol. 78, Part A, Apr. 2016, pp. 81-103, Optics & Laser Technology.

*Primary Examiner* — Roy M Punnoose
(74) *Attorney, Agent, or Firm* — Michael Dae (57) ABSTRACT

Apparatus and methods for acquiring strain profiles of an optical conductor of a wireline cable in a wellbore, either while the cable is lowered and/or at intervals during the lowering when the cable is briefly stationary. Changes in the acquired strain profiles are utilized to infer or otherwise determine changes in the disposition of the cable.

19 Claims, 8 Drawing Sheets

(56) References Cited

U.S. PATENT DOCUMENTS

| | | | |
|---|---|---|---|
| 8,831,390 B2* | 9/2014 | Kurtscheid | G02B 6/443 |
| | | | 385/101 |
| 9,523,832 B2* | 12/2016 | Stratton | G02B 6/4416 |
| 10,062,476 B2* | 8/2018 | Varkey | G02B 6/4416 |
| 2004/0045735 A1* | 3/2004 | Varkey | H01B 3/441 |
| | | | 174/120 R |
| 2006/0045442 A1* | 3/2006 | Varkey | G02B 6/4413 |
| | | | 385/102 |
| 2010/0219334 A1* | 9/2010 | Legrand | E21B 47/10 |
| | | | 250/256 |
| 2011/0088462 A1* | 4/2011 | Samson | E21B 47/10 |
| | | | 73/152.18 |
| 2012/0176250 A1* | 7/2012 | Duncan | G01V 11/002 |
| | | | 340/853.2 |
| 2012/0179378 A1* | 7/2012 | Duncan | E21B 47/123 |
| | | | 702/8 |
| 2013/0188168 A1* | 7/2013 | Hartog | E21B 47/102 |
| | | | 356/32 |
| 2013/0298665 A1* | 11/2013 | Minchau | E21B 43/26 |
| | | | 73/152.51 |

* cited by examiner

MONITORING WIRELINE COUPLING AND DISTRIBUTION

CROSS-REFERENCE TO RELATED APPLICATIONS

This application claims priority to and the benefit of U.S. Provisional Application No. 62/316,001, titled "Monitoring Wireline Cable Coupling," filed Mar. 31, 2016, the entire disclosure of which is hereby incorporated herein by reference.

BACKGROUND OF THE DISCLOSURE

Wells are generally drilled into a land surface or ocean bed to recover natural deposits of oil and gas, as well as other natural resources that are trapped in geological formations in the Earth's crust. Wellbores may be drilled along a trajectory to reach one or more subterranean rock formations containing the hydrocarbons and other downhole fluids. Information about the subsurface formations and formation fluid, such as measurements of the formation pressure, formation permeability, and recovery of formation fluid samples, may be utilized to increase well production and to predict the economic value, the production capacity, and the production lifetime of a subsurface formation. For such operations, formation testers and other downhole tools may be conveyed within the wellbore via a wireline. The wireline is a cable comprising a central section having braided conductors or groups of braided conductors, which is surrounded by load-bearing armor. The conductors are generally metal conductors, although some operations utilize a hybrid wireline cable having both metal conductors and optical fibers.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including lowering a wireline in a wellbore, the wireline having an optical conductor, and acquiring strain profiles of the optical conductor while the wireline is being lowered. The method also includes utilizing changes in the acquired strain profiles to determine a change in the disposition of the wireline.

The present disclosure also introduces a method including lowering a wireline in a wellbore, the wireline having an optical conductor, and acquiring strain profiles of the optical conductor at intervals during the lowering when the wireline is stationary. The method also includes utilizing changes in the acquired strain profiles to determine a change in the disposition of the wireline.

The present disclosure also introduces an apparatus including a processing system having a processor and a memory including computer program code. The processing system is operable to acquire strain profiles of an optical conductor of a wireline, whether while the wireline is being lowered in a wellbore, and/or at intervals during the lowering when the wireline is stationary. The processing system is also operable to utilize changes in the acquired strain profiles to determine a change in the disposition of the wireline.

These and additional aspects of the present disclosure are set forth in the description that follows and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

During wireline operations, slack in the wireline may be introduced to aid coupling with the wellbore or casing. Slack is the amount of additional cable existing between two anchor points within the wellbore. The value of slack given to the cable can vary, and the present disclosure introduces one or more aspects related to determining how much slack or "extra" cable exists between the two anchor points. This may be equivalent to determining the length of the cable when it is stretched directly between the two anchor points, then adding a predetermined additional length of cable into the wellbore.

The present disclosure also introduces one or more aspects related to determining the neutral point of the cable (i.e., when substantially no tension or compression exists), which depends on the amount of the cable slack inside the wellbore. These and/or other aspects of the present disclosure may be utilized to monitor the real-time cable behavior inside the wellbore while slack exists in the cable.

The present disclosure also introduces one or more aspects related to utilizing a static strain instrument using Brillouin scattering to measure the amount of slack along the cable and/or identify the neutral point where the slack starts in the wellbore. These and similar aspects introduced herein may also or instead relate to dynamic strain monitoring using Fast Brillouin scattering and/or Coherent Rayleigh analysis. In either implementation, the measurements and analyses may be utilized to determine an amount of slack to be added to improve the coupling of the cable to the wellbore/casing.

Figure 1:
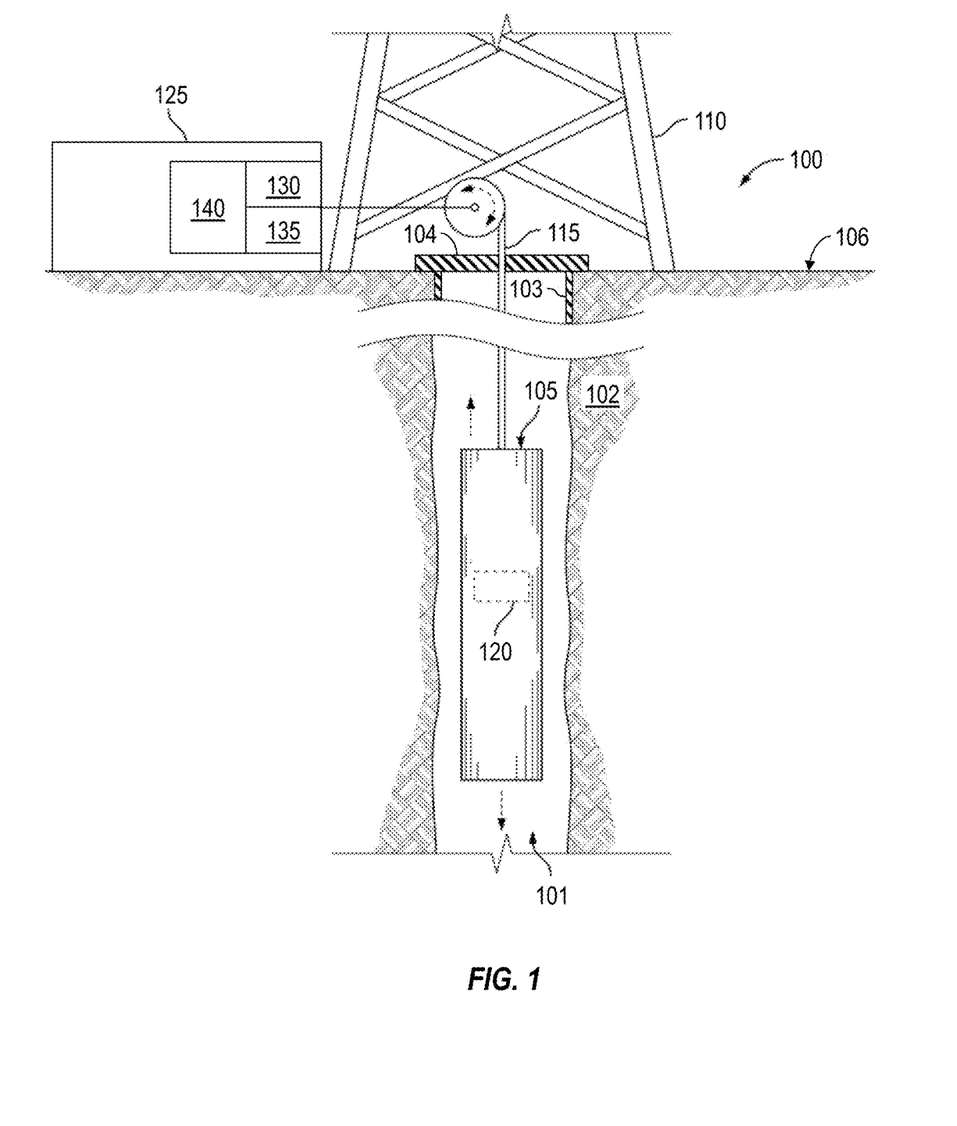
FIG. 1 is a schematic view of at least a portion of an example implementation of apparatus according to one or more aspects of the present disclosure.

FIG. 1 is a schematic view of an example system 100 that may be employed onshore and/or offshore according to one or more aspects of the present disclosure, representing an example environment in which one or more aspects described below may be implemented. As depicted in FIG. 1, a downhole tool 105 may be suspended (e.g., from a platform, rig, derrick, and/or other wellsite structure 110) in a borehole 101 extending into one or more subterranean formations 102. The downhole tool 105 may be or comprise one or more tools, one or more of which may be or comprise an acoustic tool, a conveyance tool, a density tool, an electromagnetic (EM) tool, a formation evaluation tool, a magnetic resonance tool, a monitoring tool, a neutron tool, a nuclear tool, a photoelectric factor tool, a porosity tool, a reservoir characterization tool, a resistivity tool, a seismic tool, a surveying tool, a telemetry tool, and/or a tractor tool, although other downhole tools are also within the scope of the present disclosure.

The downhole tool 105 may be deployed from the wellsite structure 110 into the borehole 101 via wireline 115. As the downhole tool 105 operates, outputs of various numbers and/or types from the downhole tool 105 and/or components thereof (one of which is designated by reference numeral 120) may be sent via the wireline 115 to a logging and control system and/or other surface equipment 125 at the wellsite surface 106, and/or may be stored in various numbers and/or types of memory for subsequent recall and/or processing after the downhole tool 105 is retrieved to the surface 106. The downhole tool 105 and/or one or more components 120 thereof may be utilized to perform at least a portion of a method according to one or more aspects of the present disclosure.

Figure 2:
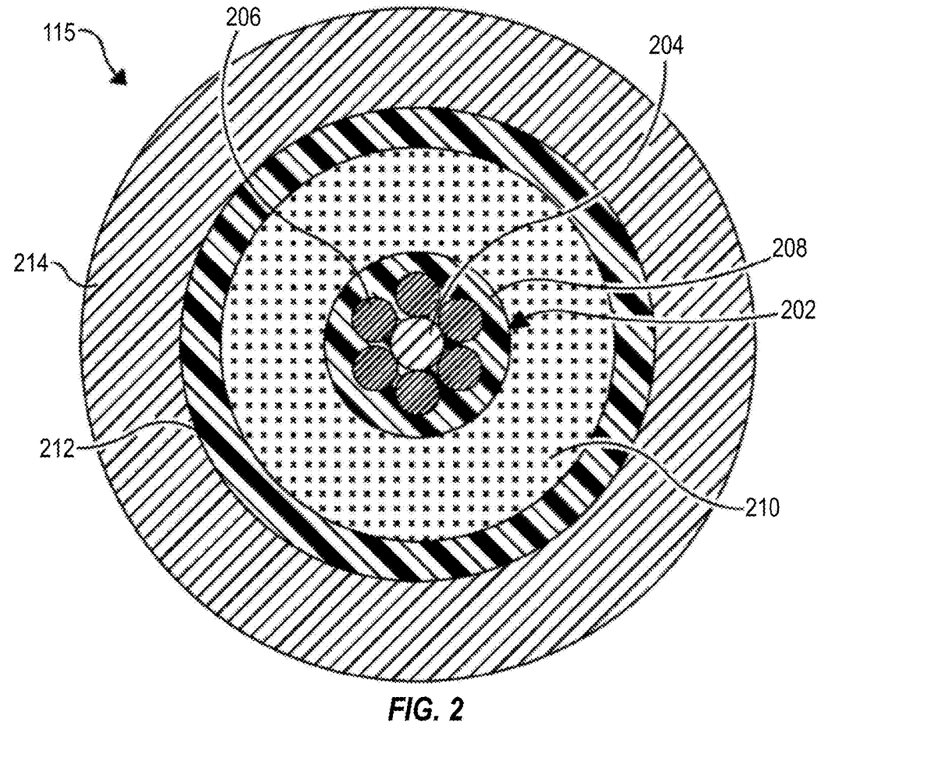
FIG. 2 is a sectional view of an example implementation of a fiber optic wireline cable according to one or more aspects of the present disclosure.

FIG. 2 is a sectional view of an example implementation of the wireline 115 according to one or more aspects of the present disclosure. The wireline 115 includes a core 202 having an optical conductor 204 centrally disposed therein. A plurality of electrical conductors 206 may be disposed around the optical conductor 204 and embedded in an insulator 208. Each electrical conductor 206 may be formed from a plurality of conductive strands (not shown) disposed adjacent each other, perhaps within a surrounding insulator (not shown). The core 202 is depicted as comprising one optical conductor 204 and six electrical conductors 206, although other numbers of optical fibers 204 and/or conductors 206 are also within the scope of the present disclosure. The optical conductor(s) 204 and/or conductor(s) 206 may define multiple power and telemetry paths for the wireline 115.

The core 202 is surrounded by a layer 210, such as may be formed from a composite, fiber reinforced material, such as a curable epoxy or thermoplastic. A polymeric jacket 212 may surround the layer 210, such as to define a cross-sectional shape (e.g., round) of the wireline 115. An outer metallic tube and/or other layer 214 may surround the jacket 212.

Referring to FIGS. 1 and 2, collectively, the wireline 115 may be utilized to obtain distributed measurements by interrogating the optical conductor 204 using laser pulses. One such interrogation method is Distributed Strain and Temperature Sensing (DSTS), a technique based on optical time domain reflectometry. For example, the surface equipment 125 may include a source 130 utilized to launch short laser pulses (e.g., probe pulses) into the optical conductor 204, and a detector 135 of the surface equipment 125 may be utilized to detect a resulting signal. The detected signal arises from scattering of the laser pulses as they travel along the optical conductor 204, of which a small proportion (the backscatter) is re-captured by the optical conductor 204 and guided back to the detector 135. The location along the wireline 115 within the wellbore 101 at which the scatter occurs is determined from the two-way travel time between the source 130 and the detector 135. DSTS uses a portion of the spectrum of the scattered light, the Brillouin lines, whose frequency offset relative to the frequency of the laser source 135 is sensitive to temperature and strain. The detector 135 and/or a DSTS processor 140 of the surface equipment 125 analyzes the frequency spectrum of the backscattered light. The frequency of the backscatter from each section of the optical conductor 204 depends on the temperature and strain experienced by that section. For example, such analysis may utilize a Brillouin Optical Time Domain Reflectometer (BOTDR) and/or Brillouin Optical Time Domain Analysis (BOTDA). The temperature effect may be subtracted from the measured frequency profile along the optical conductor 204, and the static strain experienced by the wireline 115 may then be determined. Consequently, the neutral point where the slack in the wireline 115 starts in the wellbore 101 can be identified, and a human operator can determine the amount of slack to be added to improve the coupling of the wireline 115 to the wellbore 101 or a casing 103 lining at least a portion of the wellbore 101.

The surface equipment 125 may also be utilized to perform Distributed Acoustic Sensing (DAS). Like DSTS, DAS is based on optical time domain reflectometry, but it uses the Rayleigh backscatter to measure dynamic strain along the optical conductor 204. The real-time monitoring of the Rayleigh backscatter phase can be utilized with the known sampling rate of the laser pulses to acquire a seismic profile using the DAS system.

Strain on the wireline 115 can be caused by compression or tension. When the wireline 115 is under tension and slack is added, the neutral point where the slack begins will be the location where the internal force switches from tension to compression and no longer moves when further slack is added. Assuming that the properties of the wireline 115 are constant along the wireline 115, there is a direct relationship between internal force and strain. Consequently, a measurement of strain gives a measurement of the internal force experienced by the wireline 115.

Figure 3:
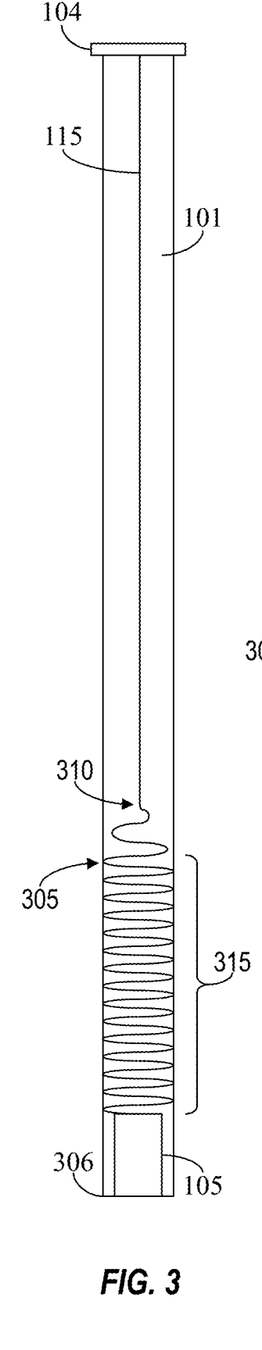
FIGS. 3-5 depict a progressive buildup of spiraled wireline as more slack is introduced according to one or more aspects of the present disclosure.
Figure 4:
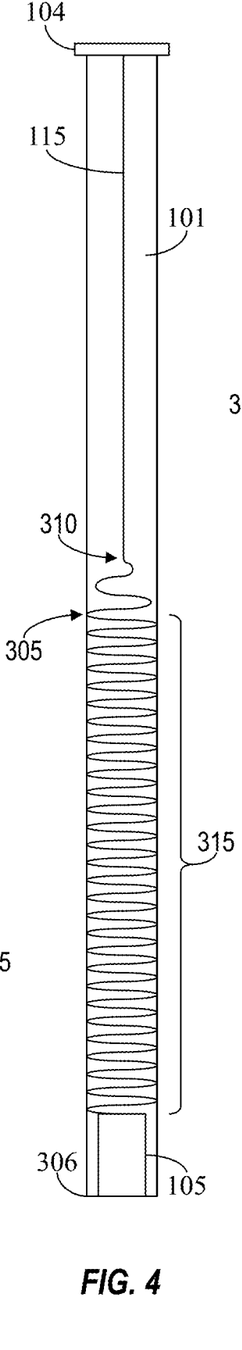
Figure 5:
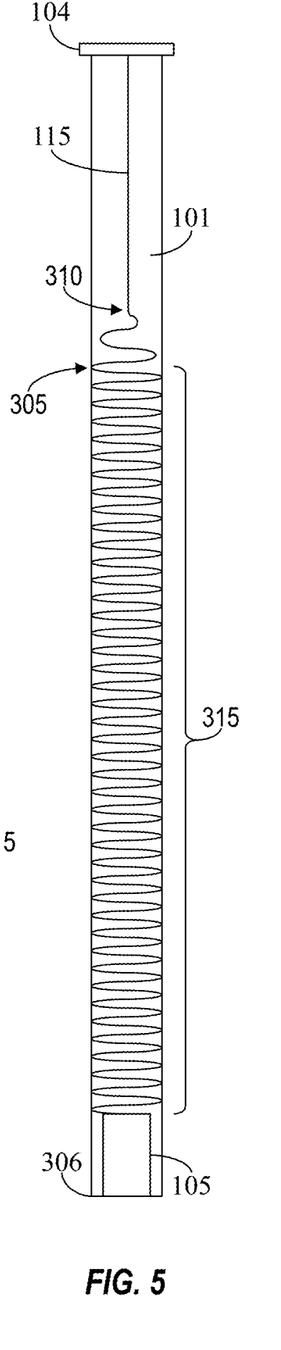

To perform this analysis, certain locations 305 and 310 shown in FIGS. 3-5 are determined after slack in the wireline 115 is introduced through the wellhead 104. FIG. 3 shows the wireline 115 just after anchoring a wireline tool 105 at the bottom 306 of the wellbore 101, and FIGS. 4 and 5 each show progressively more slack added to the wireline 115 within the wellbore 101.

Location 310 is where the wireline 115 starts to build a spiral 315 inside the wellbore 101. Location 305 is where the spiral 315 reaches its maximum pitch angle and, from that point to the wireline tool 105, the pitch angle remains substantially constant. The distance between the locations 305 and 310 depends on the well geometry, friction, and stiffness of the wireline 115. As more wireline 115 is introduced into the wellbore 101, the locations 305 and 310 move in an uphole direction, as depicted by the progression of FIGS. 3-5. The pitch angle of the wireline 115 remains constant below location 305. The friction force of the wireline 115 against the wellbore 101 (or casing 103) below location 305 supports the weight of the spiraled portion 315 of the wireline 115. Between the locations 305 and 310, static strain inside the wireline 115 increases, but the strain below location 305 remains substantially constant.

Figure 6:
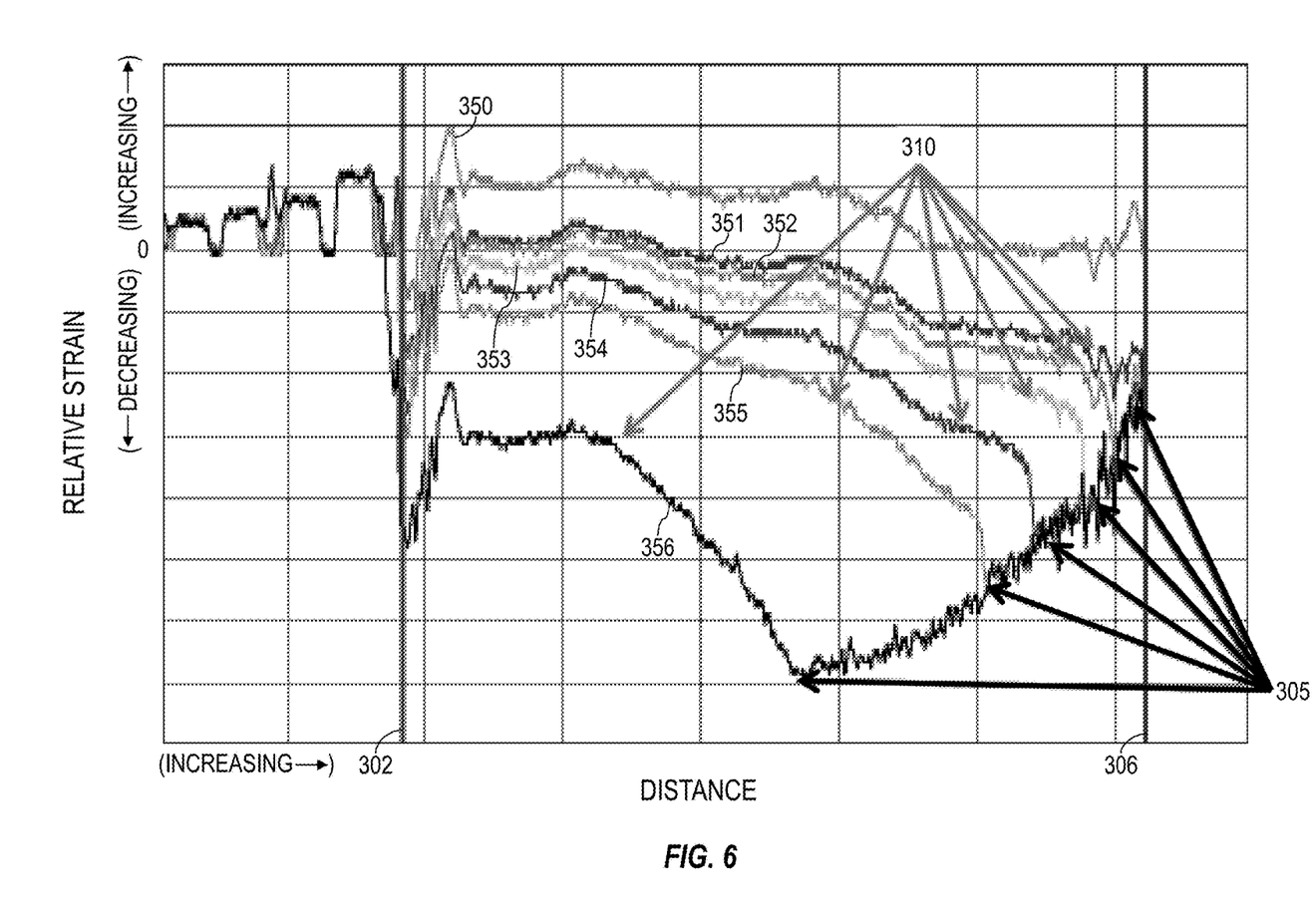
FIGS. 6-15 are graphs depicting one or more aspects related to the present disclosure.

FIG. 6 is an example of DSTS data acquired on a hybrid optical-electrical wireline connected to a DSTS optical interrogator via an optical collector. The dataset represents relative strain (Y-axis) between a various slack levels and the wireline. The various slack levels depicted include 1 meter (m) of slack 350, 2.5 m of slack 351, 5 m of slack 352, 10 m of slack 353, 20 m of slack 354, 30 m of slack 355, and 60 m of slack 356. The various slack levels 350-356 depicted in FIG. 6 show the behavior variation of the wireline 115 within the wellbore 101. The locations 305 and 310 are also shown, having been extracted from numerical simulations and in good agreement with DSTS data obtained during field-testing. Thus, real-time DSTS measurements may be utilized to predict the wireline behavior in wellbores during slacking.

This method for monitoring the slack of the wireline 115 can be run with DSTS in a single acquisition while the wireline 115 is under tension to serve as a reference. If the human operators decide to improve the coupling between the wireline 115 and the wellbore 101 (or casing 103) by adding additional slack, a second acquisition can be realized with a specific amount of slack to determine the constant pitch angle and the variable pitch angle regions. Such real-time quality control using DSTS may permit selecting a slack amount optimized for acquiring good quality DAS data in a seismic survey. One or more aspects of such methods may also aid in understanding whether the wireline 115 is coiled in a specific section of the wellbore 101 and may slip, which may increase the risk of the wireline 115 breaking, thus losing the downhole tool(s) 105 in the wellbore 101 if the coiled wireline 115 is slipping.

Figure 7:
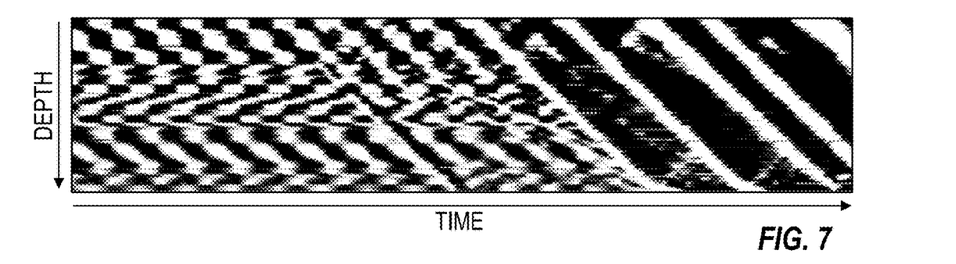
Figure 8:
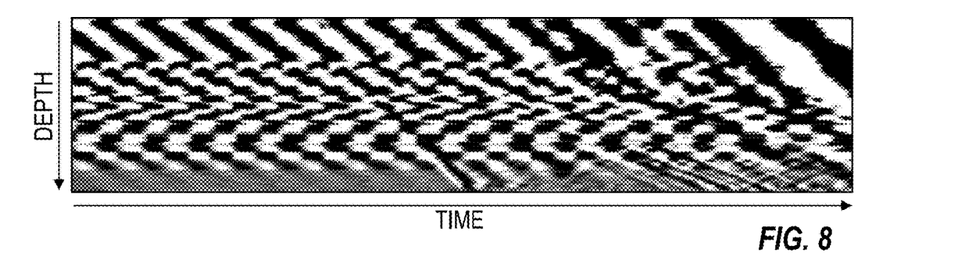
Figure 9:
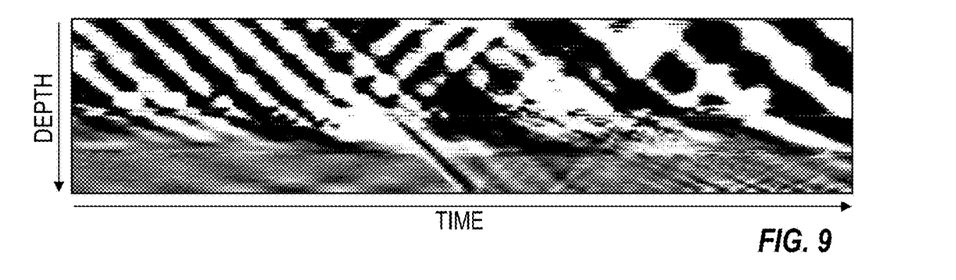
Figure 10:
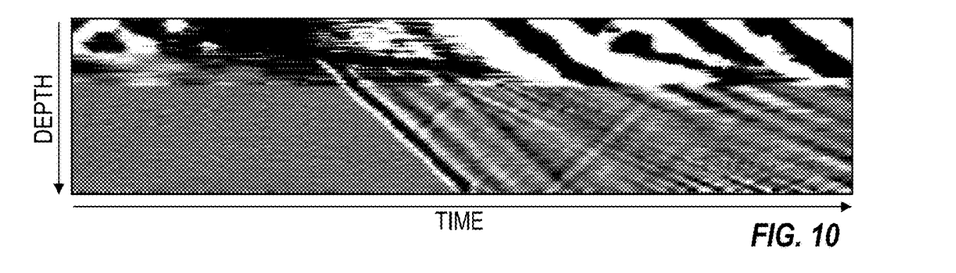
Figure 11:
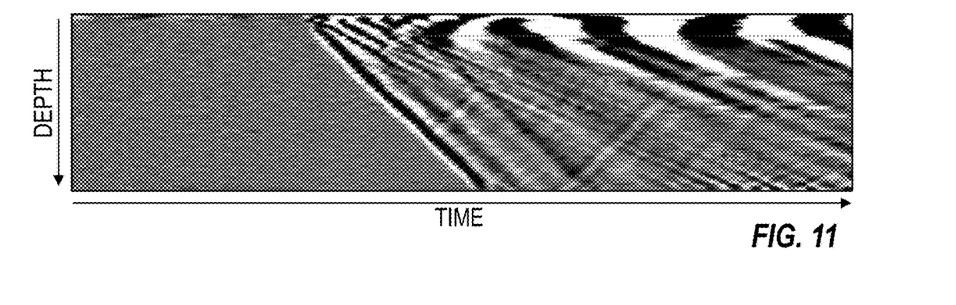

FIGS. 7-11 depict an example DAS dataset acquired in a testing well which was completely vertical, showing that data quality is improved by giving slack to the wireline, thus improving coupling between the wireline and the wellbore/casing. In FIG. 7, the wireline is under tension, while in FIGS. 8, 9, 10, and 11 the wireline has 0.1% slack, 0.5% slack, 1.0% slack, and 2.0% slack, respectively. The relative strain is given by subtracting the plot depicting the wireline under tension from each plot that represents a specific amount of slack. This may facilitate observing the effect of slack on the wireline strain and determining the neutral point where the slack is starting.

Other factors may also influence the wireline coupling to the wellbore/casing and the resulting quality of the DAS data. Such factors may include the well completion (e.g., deviation, cased-hole or open-hole, etc.) and/or the location of the laser source, as described below.

Figure 12:
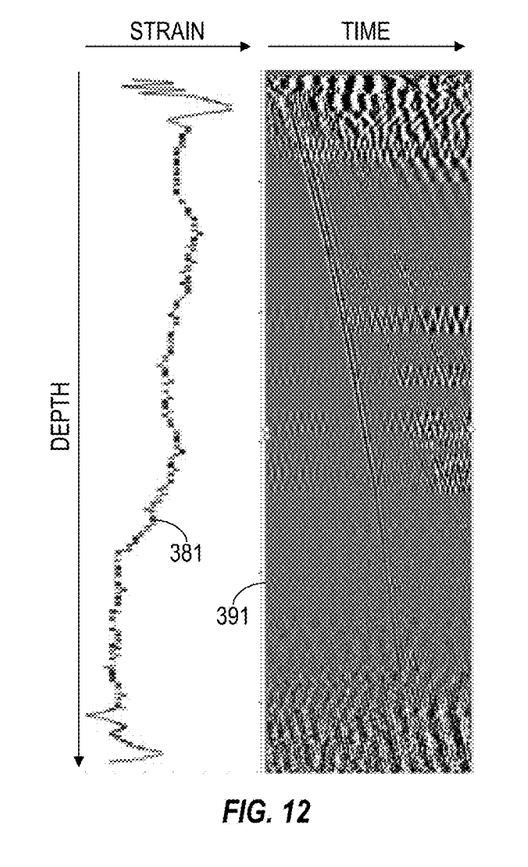
Figure 13:
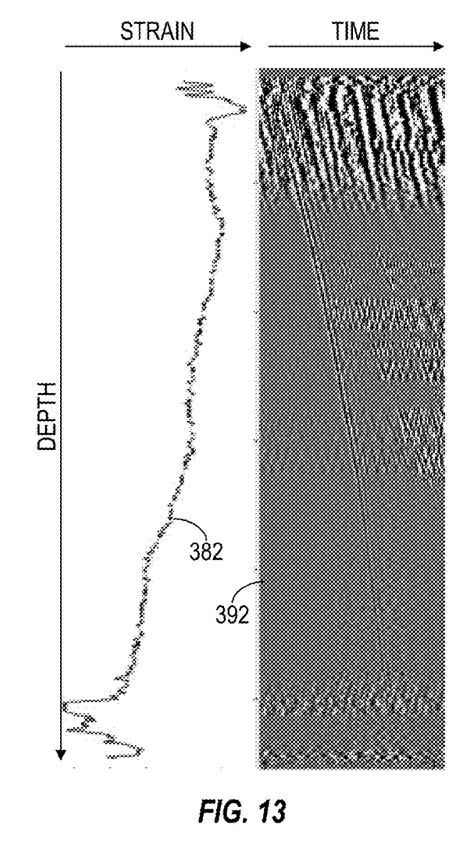
Figure 14:
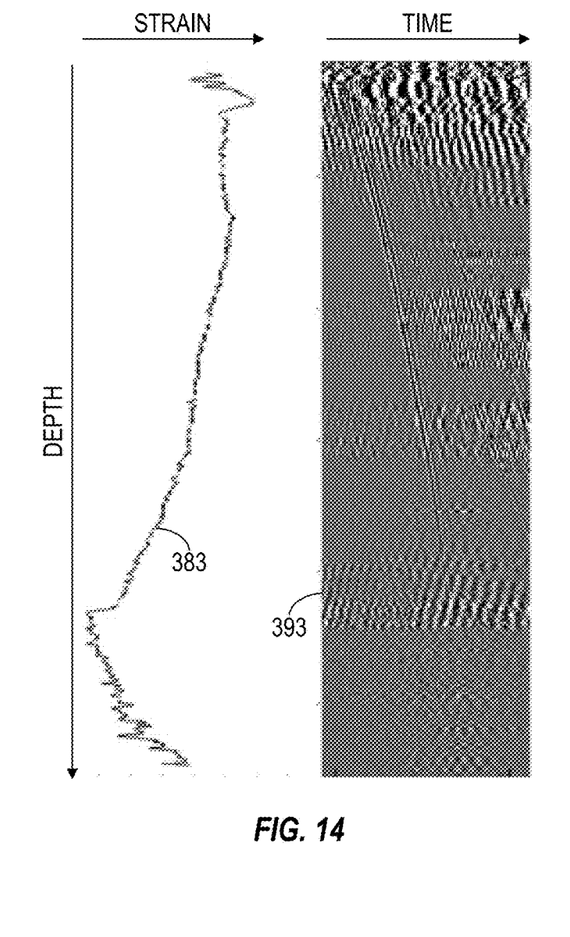
Figure 15:
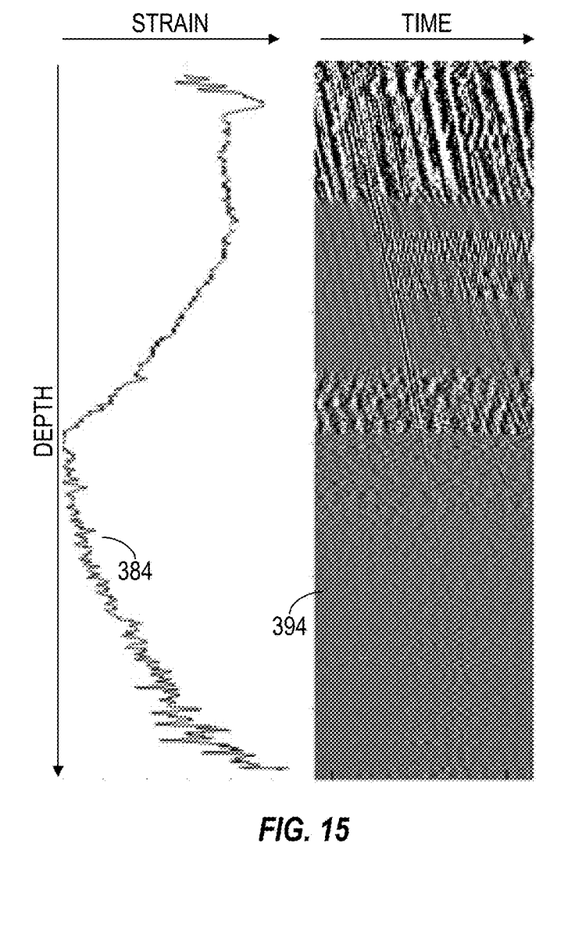

FIGS. 12-15 depict another test in a geothermal well, where the DSTS acquisition was run with slack using a hybrid wireline cable. The well was not vertical down to the bottom. Deviation of the well down to 500 m was less than 2 degrees, but increased up to 10 degrees with increasing depth, with the maximum deviation located around 1500 m. The total depth of the well was 2580 m. The last 500 m was an open-hole section. FIGS. 12-15 show the relative strain applied on the wireline when giving different amounts of slack to the wireline. In FIG. 12, the wireline was slacked by 0.04%, while in FIGS. 13, 14, and 15 the wireline was slacked by 0.4%, 1.2%, and 2.3%, respectively. Relative strain data acquired with DSTS is shown by curves 381-384, and seismic data acquired with DAS is shown by plots 391-394. The DSTS data 401-404 can be utilized to explain how the wireline behaved. Although the wireline vibration reduced in the constant pitch angle region, the signal-to-noise ratio (SNR) was also reduced.

Utilizing DAS technology in borehole seismic surveying may add the ability to run an acquisition while running a wireline tool. A hybrid wireline cable may permit such acquisition in a cost-effective manner, such as by minimizing the rig time utilized solely for the seismic operation. However, substantial SNR deteriorations for some well geometries can be related to various factors.

Numerical computations have validated a good similarity between the wireline behavior within the wellbores and the real-time static strain measurement performed by the DSTS. This may provide real-time quality control during an acquisition to better understand and identify the optimal quantity of slack to be given to the wireline to improve the overall data quality of DAS. This may also permit estimating the depth distribution of the wireline through the use of DSTS and determination of the constant pitch starting point (location 305 in FIGS. 3-5) and the variable pitch angle region (between locations 305 and 310 in FIGS. 3-5). This may also be utilized for depth calibration, such as in implementations utilizing downhole seismic tools.

Figure 16:
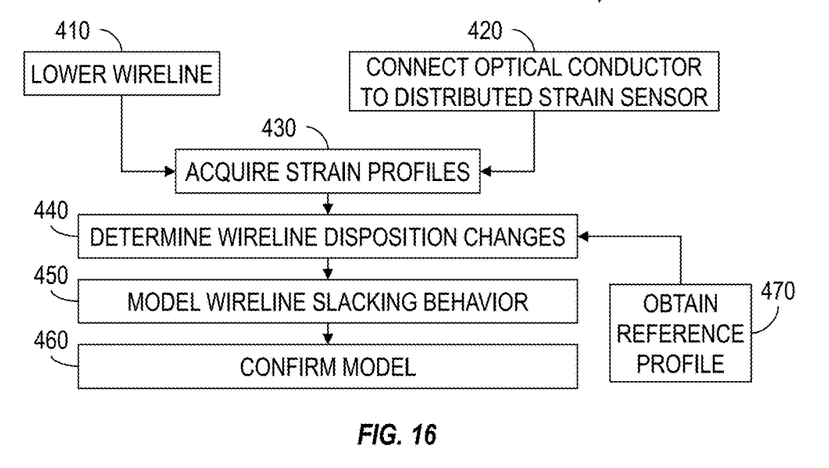
FIG. 16 is a flow-chart diagram of at least a portion of an example implementation of a method according to one or more aspects of the present disclosure.

FIG. 16 is a flow-chart diagram of at least a portion of an example implementation of a method (400) according to one or more aspects of the present disclosure. The method (400) may be utilized to determine the axial position(s) of a cable in a wellbore, such as the cable 115 and wellbore 101 shown in FIGS. 1-5, among other examples also within the scope of the present disclosure.

The method (400) may comprise lowering (410) the wireline 115 containing at least one optical conductor 204 in the wellbore 101. The at least one optical conductor 204 is also connected (420) to a distributed strain sensor, such as the detector 135 and/or other component of surface equipment 125. Strain profiles of the optical conductor 204 are acquired (430), either while the wireline 115 is lowered (410) or at intervals during the lowering (410) when the wireline 115 is briefly stationary. As described above, such acquisition (430) may utilize a BOTDR and/or BOTDA.

Changes in the acquired (430) strain are then utilized to infer or otherwise determine (440) changes in the disposition of the wireline 115, such as the locations 305 and 310 described above with respect to FIGS. 3-5. Such determination (440) may include observing locations along the wireline 115 where the strain does not change when further lengths of wireline are lowered into the wellbore 101 (i.e., adding slack) and inferring that, in these locations, the wireline 115 is in contact with the wellbore 101 (or the casing 103). The behavior of the wireline 115 during slacking may then be modeled (450), which may then be confirmed (460) by numerical simulation, such as via finite element analysis. However, the modeling (450) may be performed before the strain profile acquisition (430), such that the modeling/confirmation process does not delay decisions dependent upon the model during an actual operation.

The method (400) may also comprise obtaining (470) a reference profile of the wireline strain before the wireline 115 (or a wireline tool 105 suspended from the wireline 115) touches the bottom 306 of the wellbore 101. The obtained (470) reference profile may be utilized during the determination (440) of changes in the wireline disposition, such as by subtracting the obtained (470) reference profile from the acquired (430) strain profiles. Temperature components may also be removed from the acquired (430) strain profiles as described above.

Figure 17:
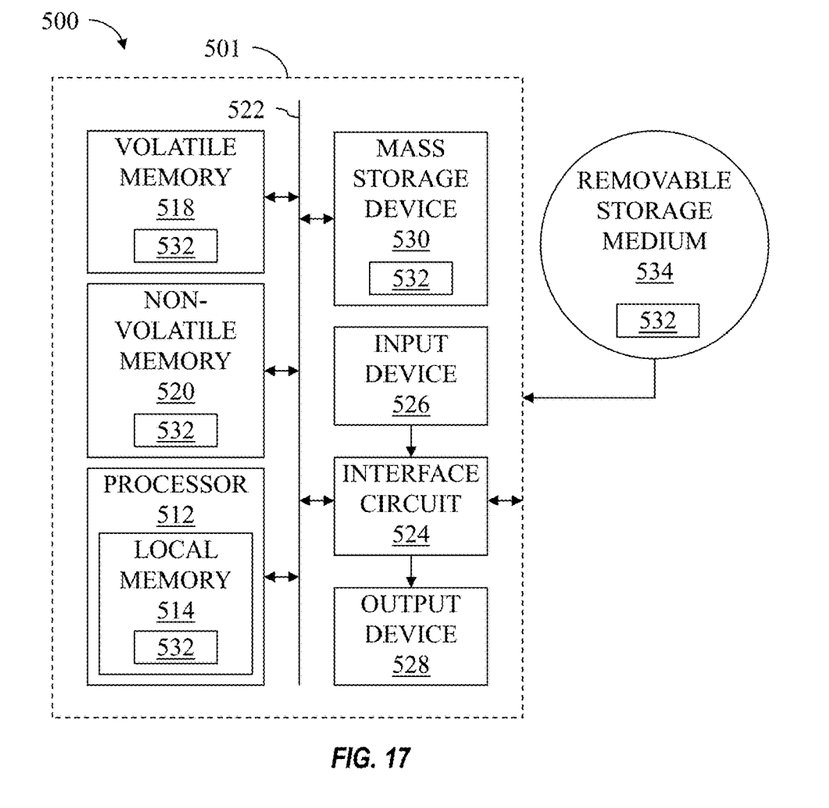
FIG. 17 is a schematic view of at least a portion of an example implementation of apparatus according to one or more aspects of the present disclosure.

FIG. 17 is a schematic view of at least a portion of an example implementation of an apparatus 500 according to one or more aspects of the present disclosure. The apparatus 500 may be or form a portion of the surface equipment 125 and/or a component 120 of the wireline tool 105 shown in FIG. 1, and may be operable to facilitate at least a portion of a method and/or process according to one or more aspects described above, such as the method (400) shown in FIG. 16.

The apparatus 500 is or comprises a processing system 501 that may execute example machine-readable instructions to implement at least a portion of one or more of the methods and/or processes described herein. For example, the processing system 501 may be operable to receive, store, and/or execute computer programs or coded instructions 532, such as may cause the performance of at least a portion of a method and/or process described herein. The processing system 501 may be programmed or otherwise receive the coded instructions 532 at the wellsite 100 prior to conveying the wireline 115 and/or downhole tool 105 within the wellbore 101.

The processing system 501 may be or comprise, for example, one or more processors, controllers, special-purpose computing devices, servers, personal computers, personal digital assistant (PDA) devices, smartphones, smart glasses, tablets, internet appliances, and/or other types of computing devices. The processing system 501 may comprise a processor 512, such as, for example, a general-purpose programmable processor. The processor 512 may comprise a local memory 514, and may execute the coded instructions 532 present in the local memory 514 and/or another memory device. The processor 512 may execute, among other things, machine-readable instructions or programs to implement the methods and/or processes described herein. The processor 512 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 512 may be in communication with a main memory, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAIVIBUS dynamic random access memory (RDRAM) and/or other types of random access memory devices. The non-volatile memory 520 may be, comprise, or be implemented by read-only memory, flash memory and/or other types of memory devices. One or more memory controllers (not shown) may control access to the volatile memory 518 and/or the non-volatile memory 520.

The processing system 501 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, a satellite interface, a global positioning system (GPS) and/or a cellular interface or receiver, among others. The interface circuit 524 may also comprise a graphics driver card. The interface circuit 524 may also comprise a device, such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 526 may be connected to the interface circuit 524. The input device(s) 526 may permit a user to enter data and commands into the processor 512. The input device(s) 526 may be, comprise, or be implemented by, for example, a keyboard, a mouse, a touchscreen, a track-pad, a trackball, an isopoint, and/or a voice recognition system, among others.

One or more output devices 528 may also be connected to the interface circuit 524. The output devices 528 may be, comprise, or be implemented by, for example, display devices (e.g., a light-emitting diode (LED) display, a liquid crystal display (LCD, or a cathode ray tube (CRT) display, among others), printers, and/or speakers, among others.

The processing system 501 may also comprise one or more mass storage devices 530 for storing machine-readable instructions and data. Examples of such mass storage devices 530 include floppy disk drives, hard drive disks, compact disk (CD) drives, and digital versatile disk (DVD) drives, among others. The coded instructions 532 may be stored in the mass storage device 530, the volatile memory 518, the non-volatile memory 520, the local memory 514, and/or on a removable storage medium 534, such as a CD or DVD. Thus, the modules and/or other components of the processing system 501 may be implemented in accordance with hardware (embodied in one or more chips including an integrated circuit, such as an ASIC), or may be implemented as software or firmware for execution by a processor. In the case of firmware or software, the embodiment may be provided as a computer program product including a computer readable medium or storage structure embodying computer program code (i.e., software or firmware) thereon for execution by the processor.

In view of the entirety of the present disclosure, including the figures and the claims, a person having ordinary skill in the art will readily recognize that the present disclosure introduces a method comprising: lowering a wireline in a wellbore, wherein the wireline comprises an optical conductor; acquiring strain profiles of the optical conductor while the wireline is being lowered; and utilizing changes in the acquired strain profiles to determine a change in the disposition of the wireline.

The method may further comprise connecting the optical conductor to a distributed strain sensor of surface equipment disposed at a wellsite surface from which the wellbore extends, wherein acquiring the strain profiles may utilize the distributed strain sensor.

Determining the wireline disposition change may comprise observing locations along the wireline where strain does not change in response to further lowering the wireline in the wellbore. In such implementations, among others within the scope of the present disclosure, determining the wireline disposition change may further comprise inferring that the wireline is in contact with a sidewall or casing of the wellbore at the observed locations where strain does not change in response to further lowering the wireline in the wellbore.

The method may further comprising modeling behavior of the wireline during slacking, based on the acquired strain profiles and the determined wireline disposition change. In such implementations, among others within the scope of the present disclosure, the method may further comprise confirming the slacking wireline model and acquired strain profiles by numerical simulation. The numerical simulation may comprise finite element analysis.

The method may further comprise obtaining a reference profile of the wireline strain before the wireline, or a wireline tool suspended in the wellbore from the wireline, touches the bottom of the wellbore, wherein determining the change in the wireline disposition may utilize the obtained reference profile and the changes in the acquired strain profiles. In such implementations, among others within the scope of the present disclosure, utilizing the obtained reference profile may comprise subtracting the obtained reference profile from each of the acquired strain profiles.

The present disclosure also introduces a method comprising: lowering a wireline in a wellbore, wherein the wireline comprises an optical conductor; acquiring strain profiles of the optical conductor at intervals during the lowering when the wireline is stationary; and utilizing changes in the acquired strain profiles to determine a change in the disposition of the wireline.

The method may further comprise connecting the optical conductor to a distributed strain sensor of surface equipment disposed at a wellsite surface from which the wellbore extends, wherein acquiring the strain profiles may utilize the distributed strain sensor.

Determining the wireline disposition change may comprise observing locations along the wireline where strain does not change in response to further lowering the wireline in the wellbore. In such implementations, among others within the scope of the present disclosure, determining the wireline disposition change may further comprise inferring that the wireline is in contact with a sidewall or casing of the wellbore at the observed locations where strain does not change in response to further lowering the wireline in the wellbore.

The method may further comprise modeling behavior of the wireline during slacking, based on the acquired strain profiles and the determined wireline disposition change. In such implementations, among others within the scope of the present disclosure, the method may further comprise confirming the slacking wireline model and acquired strain profiles by numerical simulation. The numerical simulation may comprise finite element analysis.

The method may further comprise obtaining a reference profile of the wireline strain before the wireline, or a wireline tool suspended in the wellbore from the wireline, touches the bottom of the wellbore, wherein determining the change in the wireline disposition may utilize the obtained reference profile and the changes in the acquired strain profiles. In such implementations, among others within the scope of the present disclosure, utilizing the obtained reference profile may comprise subtracting the obtained reference profile from each of the acquired strain profiles.

The present disclosure also introduces an apparatus comprising a processing system comprising a processor and a memory including computer program code, wherein the processing system is operable to: (A) acquire strain profiles of an optical conductor of a wireline: (i) while the wireline is being lowered in a wellbore; or (ii) at intervals during the lowering when the wireline is stationary; and (B) utilize changes in the acquired strain profiles to determine a change in the disposition of the wireline.

The processing system may comprise a distributed strain sensor connectable to the optical conductor, and acquiring the strain profiles may utilize the distributed strain sensor.

Determining the wireline disposition change may comprise observing locations along the wireline where strain does not change in response to further lowering the wireline in the wellbore. In such implementations, among others within the scope of the present disclosure, determining the wireline disposition change may further comprise inferring that the wireline is in contact with a sidewall or casing of the wellbore at the observed locations where strain does not change in response to further lowering the wireline in the wellbore.

The processing system may be further operable to model behavior of the wireline during slacking, based on the acquired strain profiles and the determined wireline disposition change. In such implementations, among others within the scope of the present disclosure, the processing system may be further operable to confirm the slacking wireline model and acquired strain profiles by numerical simulation. The numerical simulation may comprise finite element analysis.

The processing system may be further operable to obtain a reference profile of the wireline strain before the wireline, or a wireline tool suspended in the wellbore from the wireline, touches the bottom of the wellbore, and determining the change in the wireline disposition may utilize the obtained reference profile and the changes in the acquired strain profiles. In such implementations, among others within the scope of the present disclosure, utilizing the obtained reference profile may comprise subtracting the obtained reference profile from each of the acquired strain profiles.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the implementations introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:
1. A method comprising:
lowering a wireline in a wellbore, wherein the wireline includes a core having an optical conductor centrally disposed in said wireline;
connecting the optical conductor to a distributed strain sensor of surface equipment disposed at a wellsite surface from which the wellbore extends, acquiring strain profiles of the optical conductor while the wireline is being lowered, wherein acquiring the strain profiles utilizes the distributed strain sensor; and determining a change in the coupling of the wireline to the wellbore based on the acquired strain profile.

2. The method of claim 1 wherein determining the wireline coupling change comprises observing locations along the wireline where strain does not change in response to further lowering the wireline in the wellbore.

3. The method of claim 2 wherein determining the wireline coupling change further comprises inferring that the wireline is in contact with a sidewall or casing of the wellbore at the observed locations where strain does not change in response to further lowering the wireline in the wellbore.

4. The method of claim 1 further comprising modeling behavior of the wireline during slacking, based on the acquired strain profiles and the determined wireline coupling change.

5. The method of claim 4 further comprising confirming the slacking wireline model and acquired strain profiles by numerical simulation.

6. The method of claim 5 wherein the numerical simulation comprises finite element analysis.

7. The method of claim 1 further comprising obtaining a reference profile of the wireline strain before the wireline, or a wireline tool suspended in the wellbore from the wireline, touches the bottom of the wellbore, wherein determining the change in the wireline coupling utilizes the obtained reference profile and the changes in the acquired strain profiles.

8. The method of claim 7 wherein utilizing the obtained reference profile comprises subtracting the obtained reference profile from each of the acquired strain profiles.

9. The method of claim 1, wherein it comprises selecting a slack amount of the wireline cable based on the coupling change determination.

10. The method of claim 9, including performing a Distributed Acoustic Sensing measurement using the optical conductor and the surface equipment to acquire a seismic profile of the formation.

11. A method comprising:
lowering a wireline in a wellbore, wherein the wireline includes a core having an optical conductor centrally disposed in said wireline;
connecting the optical conductor to a distributed strain sensor of surface equipment disposed at a wellsite surface from which the wellbore extends,
acquiring strain profiles of the optical conductor at intervals during the lowering when the wireline is stationary, wherein acquiring the strain profiles utilizes the distributed strain sensor; and
determining a change in the coupling of the wireline to the wellbore based on the acquired strain profile.

12. The method of claim 11 wherein determining the wireline coupling change comprises observing locations along the wireline where strain does not change in response to further lowering the wireline in the wellbore.

13. The method of claim 12 wherein determining the wireline coupling further comprises inferring that the wireline is in contact with a sidewall or casing of the wellbore at the observed locations where strain does not change in response to further lowering the wireline in the wellbore.

14. The method of claim 11 further comprising modeling behavior of the wireline during slacking, based on the acquired strain profiles and the determined wireline coupling change.

15. The method of claim 14 further comprising confirming the slacking wireline model and acquired strain profiles by numerical simulation.

16. The method of claim 11 further comprising obtaining a reference profile of the wireline strain before the wireline, or a wireline tool suspended in the wellbore from the wireline, touches the bottom of the wellbore, wherein determining the change in the wireline coupling utilizes the obtained reference profile and the changes in the acquired strain profiles.

17. The method of claim 16 wherein utilizing the obtained reference profile comprises subtracting the obtained reference profile from each of the acquired strain profiles.

18. A system comprising:
a wireline including a core having an optical conductor centrally disposed in said wireline, wherein the optical conductor is connected to a distributed strain sensor of surface equipment disposed at a wellsite surface from which the wellbore extends
a processing system comprising a processor and a memory including computer program code, wherein the processing system is operable to:
acquire strain profiles of the optical conductor using the distributed strain sensor:
while the wireline is being lowered in a wellbore; or
at intervals during the lowering when the wireline is stationary; and
determine a change in the coupling of the wireline to the wellbore based on the acquired strain profile.

19. The system of claim 18 wherein determining the wireline coupling change comprises observing locations along the wireline where strain does not change in response to further lowering the wireline in the wellbore.

* * * * *